United States Patent [19]

Chamberlain et al.

[11] Patent Number: 5,245,151

[45] Date of Patent: Sep. 14, 1993

[54] METHOD AND ARTICLE FOR MICROWAVE BONDING OF SPLICE CLOSURE

[75] Inventors: Craig S. Chamberlain, Woodbury; Daryl D. Dressler, St. Paul; Brian J. Fish, White Bear Lake, all of Minn.

[73] Assignee: Minnesota Mining and Manufacturing Company, St. Paul, Minn.

[21] Appl. No.: 800,644

[22] Filed: Nov. 27, 1991

Related U.S. Application Data

[63] Continuation-in-part of Ser. No. 588,591, Sep. 26, 1990, which is a continuation-in-part of Ser. No. 335,044, Apr. 7, 1989, abandoned.

[51] Int. Cl.$^5$ ............................................. H05B 6/64
[52] U.S. Cl. ........................... 219/10.57; 219/10.55 R; 219/10.55 M; 219/10.61 R; 219/10.79; 174/41; 174/92; 174/93
[58] Field of Search ................ 219/10.55 E, 10.55 F, 219/10.55 M, 10.57, 10.61 R, 10.61 A, 10.79, 7.5, 8.5, 10.55 R; 156/272.2, 272.4, 274.8; 174/41, 91, 92, 93; 428/323, 328; 220/420

[56] References Cited

U.S. PATENT DOCUMENTS

| | | | |
|---|---|---|---|
| 3,143,364 | 8/1964 | Klein | 285/55 |
| 3,519,517 | 7/1970 | Dench | 156/380 |
| 3,574,031 | 4/1971 | Heller, Jr. et al. | 156/273 |
| 3,620,875 | 11/1971 | Guglielmo et al. | 156/272 |
| 3,657,038 | 4/1972 | Lightfoot | 156/106 |
| 3,709,775 | 1/1973 | James | 161/162 |
| 3,730,804 | 5/1973 | Dickey | 156/272 |
| 3,802,985 | 4/1974 | Leatherman | 156/244 |
| 3,826,521 | 7/1974 | Wilhelmsen | 285/15 |
| 3,996,090 | 12/1976 | Leatherman | 156/244 |
| 4,067,765 | 1/1978 | Heller, Jr. et al. | 156/272 |
| 4,095,044 | 6/1978 | Horsma et al. | 174/138 |
| 4,194,082 | 3/1980 | Campbell | 174/74 |
| 4,392,014 | 7/1983 | Trumble et al. | 174/92 |
| 4,544,600 | 10/1985 | Kern | 428/323 |
| 4,618,525 | 10/1986 | Chamberlain et al. | 428/209 |
| 4,624,798 | 11/1986 | Gindrup et al. | 252/62.54 |
| 4,626,642 | 12/1986 | Wang et al. | 219/10.55 |
| 4,639,546 | 1/1987 | Meltsch | 174/92 |
| 4,743,209 | 5/1988 | Gittle | 174/92 |
| 4,749,833 | 6/1988 | Novorsky et al. | 219/10.43 |
| 4,762,864 | 8/1988 | Goel et al. | 523/428 |
| 4,810,829 | 3/1989 | Rutenbeck et al. | 174/41 |
| 4,857,672 | 8/1989 | Rebers et al. | 174/93 |
| 4,859,809 | 8/1989 | Jervis | 174/92 |
| 4,906,497 | 3/1990 | Hellmann et al. | 428/49 |
| 5,021,293 | 6/1991 | Huang et al. | 428/328 |

FOREIGN PATENT DOCUMENTS

| | | | |
|---|---|---|---|
| 1237970 | 6/1988 | Canada | 154/107.2 |
| 54-58777 | 5/1979 | Japan . | |
| US88/02909 | 6/1989 | PCT Int'l Appl. . | |

OTHER PUBLICATIONS

"Electromagnetic Bonding of Thermoplastics" by M. Chookazian, published Sep. 1975, issue of Plastics Design & Processing, pp. 18-20.

Instructions entitled "Installation Procedures 2-Type Closure System 510 Version" published by PSI Telecommunications, Inc. bearing a copyright date of 1986.

Instructions entitled "XAGA 1600 Installation Instructions" published by Raychem, printing date of Aug. 1982.

U.S. Patent Application Ser. No. 07/668974 filed on Mar. 13, 1991.

U.S. Patent Application Ser. No. 07/423220 filed on Oct. 18, 1989.

*Primary Examiner*—Bruce A. Reynolds
*Assistant Examiner*—Tu Hoang
*Attorney, Agent, or Firm*—Gary L. Griswold; Walter N. Kirn; Jack V. Musgrove

[57] ABSTRACT

A method and article for microwave bonding of thermoplastic closures such as that used in splicing telecommunications wires. The article is a composite bonding material (CBM) having a thermoplastic matrix (preferably polyethylene) which is miscible with the thermoplastic material of the closure, and a plurality of microwave susceptor particles dispersed throughout the matrix. A strip is fashioned from the CBM and may be applied to the sealing edges of the closure. Upon application of microwave energy in an amount sufficient to heat the susceptors and cause both the CBM matrix and the adjacent portion of the closure to melt and flow together, a fusion bond is produced which seals the closure. If the closure is being used with a cable having an inner conductive layer or sheath, a second CBM may be used at this seal, having magnetically reactive susceptors.

10 Claims, 3 Drawing Sheets

METHOD AND ARTICLE FOR MICROWAVE BONDING OF SPLICE CLOSURE

CROSS-REFERENCE TO RELATED APPLICATION

This application is a continuation-in-part of pending U.S. patent application Ser. No. 07/588,591 filed Sep. 26, 1990, which is a continuation-in-part of U.S. patent application Ser. No. 07/335,044 filed Apr. 7, 1989, now abandoned.

BACKGROUND OF THE INVENTION

1. Field of the Invention

The present invention generally relates to methods and devices used to attach structural members, and more particularly to a method and article for fusion bonding closures such as those used to protect electrical splices of wiring for power or telecommunications.

2. Description of the Prior Art

Cables, such as those used for telecommunications and power supply, often carry hundreds of pairs of insulated wires enclosed within flexible shields or tubular sheaths. When two or more cable ends are joined together, for example when extending a cable, tapping into an existing cable, or repairing a severed cable, a splice or splice area is created. Generally, it is necessary to provide a closure for such splices to protect the splice against harmful environmental influences, regardless of whether the cable is aerial or buried.

One persistent problem in the use of splice closures consequently involves the need for a complete seal around the splice. Most prior art splice closures accomplish sealing by providing a complex array of nuts and bolts, clamps, gaskets and heat shrink (thermoelastic) tubing, as well as potting gels and resins, in various combinations. Besides the fact that these closure methods require significant assembly time, the closures still often suffer leaks or ruptures, particularly along their seals. This problem is even more acute at the sealing of the closure to the cable jacket (the outermost layer of the cable), where even the slightest defect can result in the migration of moisture along the jacket or the inner surface of the closure. Such moisture progresses into the splice area and adversely affects the electrical connections therein, often even when heat shrink tubing is used, since such tubing provides at best only a weak adhesive bond to the cable jacket. The use of heat shrink tubing in the construction of splice closures is further limited by the requirement for an open flame, which in many cases (e.g., splices in trenches or manholes) can be very dangerous due to the possible presence of explosive gases.

Leakage at seals may be somewhat reduced by the use of special closure designs such as so-called clamshell designs which include a hinge integrally molded with the top and bottom halves of the closure. One such exemplary closure is illustrated in U.S. Pat. No. 4,810,829, which is referred to as a SLiC splice closure (SLiC is a trademark of Minnesota Mining and Manufacturing Co.). Nevertheless, moisture migration is still possible along the longitudinal seal of such a closure, as well as at the end caps or seals to the cable jacket. A lack of a complete (hermetic) seal can also be particularly detrimental for pressurized closures. Although these seals may be strengthened by the use of adhesives, the adhesive bonds formed are relatively weak due to the material of the closures, viz., polyethylene. U.S. Pat. No. 3,143,364 discusses the great difficulty in bonding nearly anything to polyethylene. It would, therefore, be desirable and advantageous to devise a method of bonding splice closures which simplifies the process and yet yields improved sealing of the closure and, hence, improved protection against environmental influences.

SUMMARY OF THE INVENTION

The foregoing objectives are achieved in a method of bonding splice closures formed of a thermoplastic polymer by applying a strip of microwave-heatable, composite bonding material to the splice closure edge seals and/or end seals, and applying microwave energy to the material. The composite bonding material (CBM) is comprised of (i) a thermoplastic polymer matrix which is miscible with the polymeric material of the closure, preferably also miscible with the material of the cable jacket, and most preferably the same as the material of the closure and jacket, and (ii) microwave susceptor particles dispersed throughout the CBM matrix.

The CBM may be formed into thin strips according to the size and shape of the edge and end seals, and prepositioned on the closure at these seals. Similar CBM sleeves or strips may be used to repair ruptures in an intermediate portion of the cable or to repair existing closures which have developed cracks. The proper use of such a fusion bonding technique results in a hermetic seal of the splice closure.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
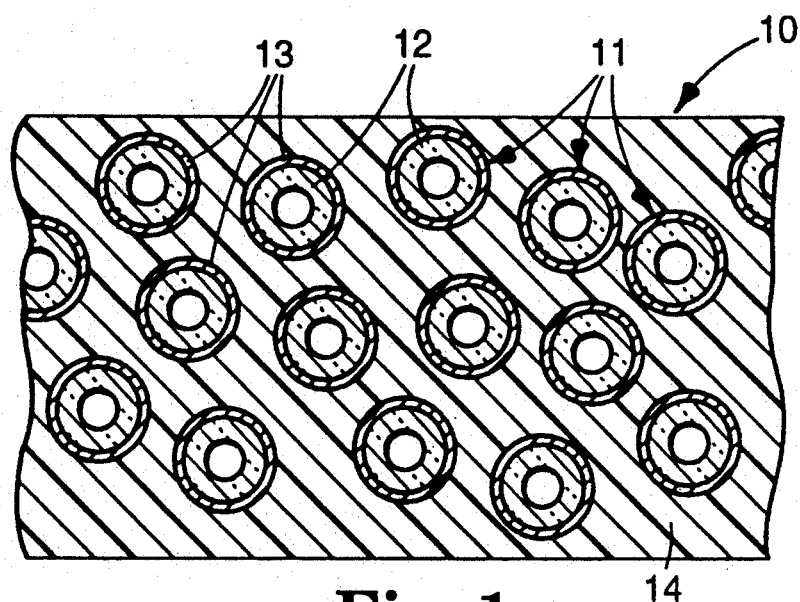
FIG. 1 is an enlarged elevational section view of a composite bonding material according to the present invention.

With reference now to the figures, and in particular with reference to FIG. 1, there is depicted, in a section view, a strip 10 of the composite bonding material (CBM) of the present invention. The CBM is generally comprised of a plurality of susceptor particles 11 which are formed from a substrate 12 having one or more coatings 13 thereon, the particles 11 being dispersed in a matrix 14. Additional details regarding various susceptor particles and matrix materials may be found in the parent application, Ser. No. 07/588,591, the disclosure of which is incorporated by reference. Disclosed matrix materials include silicone, silicone rubbers, and hot melt powders. Disclosed susceptor substrates include glass, mica, ceramic, polymers and adhesives, able to receive and support a coating of a thin, continuous, conductive or semi-conductive film. Disclosed substrate coatings include conductive and semiconductive materials having an electrical resistivity in the range of $10^{-6}$ ohm-cm to $10^7$ ohm-cm, and preferably resulting in a susceptor particulate having a bulk power resistivity in the range of $10^{-2}$ ohm-cm to $10^8$ ohm-cm; preferred coating materials include tungsten, zirconium, copper, iron, titanium, chromium, silver, molybdenum and aluminum, as well as metal oxides, nitrides, carbides, silicides, borides and phosphides. Coating thickness is most preferably in the range of 1-100 Angstroms. The susceptor substrates may be coated using the same technique (viz., vapor deposition, as in sputtering or vapor coating) as described in U.S. Pat. No. 4,618,525, which is also incorporated by reference.

The present invention is directed to use of the CBM for the purpose of bonding thermoplastic closures, primarily those used to protect splices of telecommunications cables. The terms "join" and "bond" as used herein contemplate not only the sealing of a new splice closures, but also the repair (patch) of an old closure or a rupture in an intermediate portion of a cable.

Figure 2:
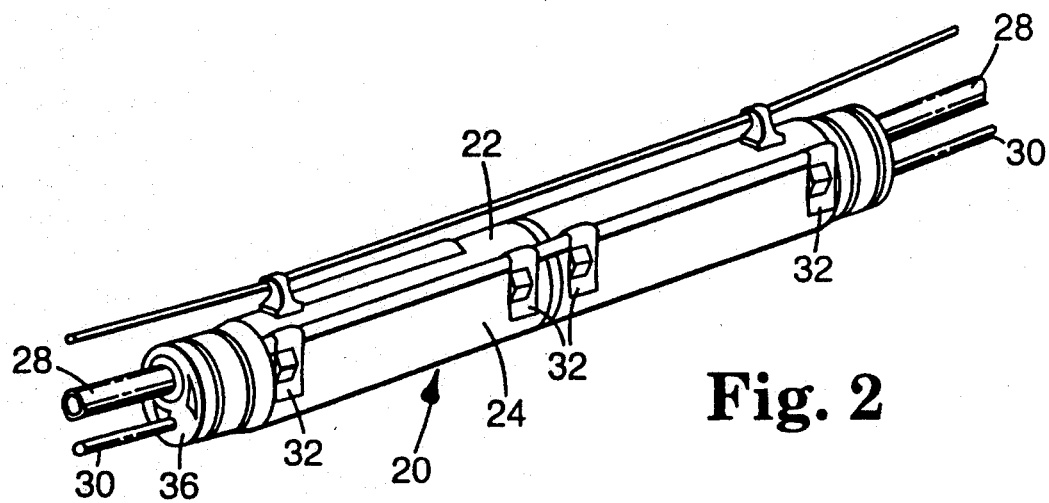
FIG. 2 is a perspective view of a SLiC brand aerial closure which may be sealed according to the method of the present invention.
Figure 3:
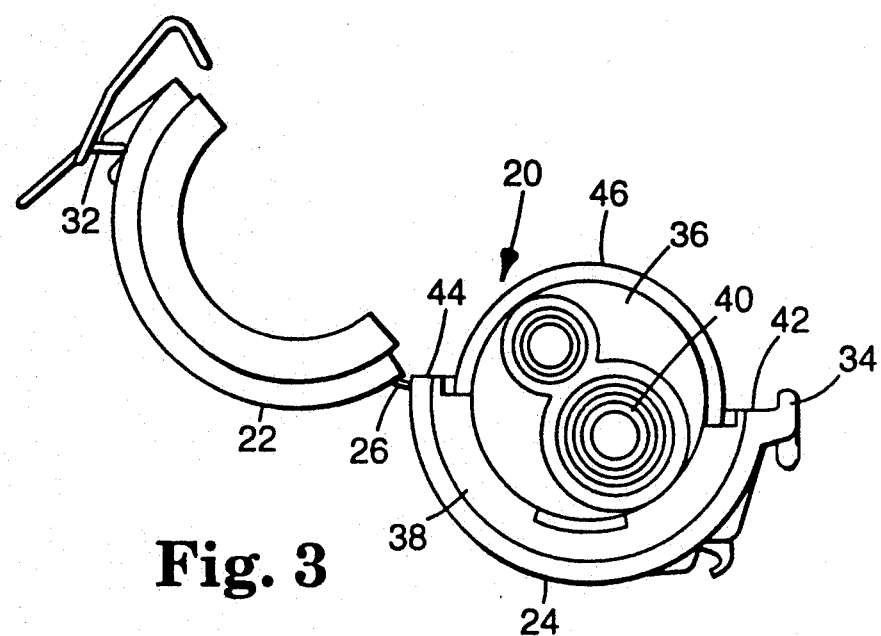
FIG. 3 is a side elevational view of one end of the SLiC brand closure.

Referring now to FIGS. 2 and 3, an exemplary splice closure 20 sold by Minnesota Mining and Manufacturing Co. (3M) under the trademark SLiC, which may be sealed according to the present invention, is depicted. Closure 20 is a clamshell design, i.e., it has top and bottom halves 22 and 24 which are nearly identical, and are attached to one another along a longitudinal hinge 26 which is integrally molded with top and bottom halves 22 and 24. Additional details regarding this particular design may be found in U.S. Pat. No. 4,810,829, which is hereby incorporated by reference. Closure 20 may be made of any durable material, but most closures are typically made of thermoformable polymers, such as polyolefins, and particularly polyethylene.

Closure 20 is used to protect a splice of one or more cables 28 and 30, and is longitudinally sealed by means of a plurality of locking clamps 32 on top half 22 which securely fit about a plurality of correspondingly placed flanges 34 on bottom half 24. End caps 36 are used to seal the splice ends about the cable jackets, and may be snugly held in annular grooves 38 formed along the inner wall of each end of closure 20. In the SLiC design, a plurality of concentric rings 40, integrally formed but defined by circular paths of decreased thickness, are used to adaptably form holes of appropriate diameter to accommodate the cables 28, 30.

The CBM of the present invention may be used to seal various closures by providing a plurality of strips, sleeves or gaskets, as necessary, made of the CBM, to fit along each interface to be sealed. For example, closure 20 may be longitudinally sealed by providing a strip 42 of CBM along the shelf formed at the interface between top and bottom halves 22 and 24. For additional protection, a second strip 44 may be positioned between the halves adjacent hinge 26. End cap 36 is sealed to closure 20 by means of another strip or sleeve 46 which surrounds the periphery of cap 36. Cap 36 may be sealed to the jackets of cables 28 and 30 by providing similar (but smaller) sleeves between the cables and the holes formed at rings 40; rings 40 may optionally themselves be formed of CBM. All of the CBM strips, sleeves, etc., may be provided on the appropriate surfaces of the closure at the factory, further simplifying the sealing process.

Figure 4:
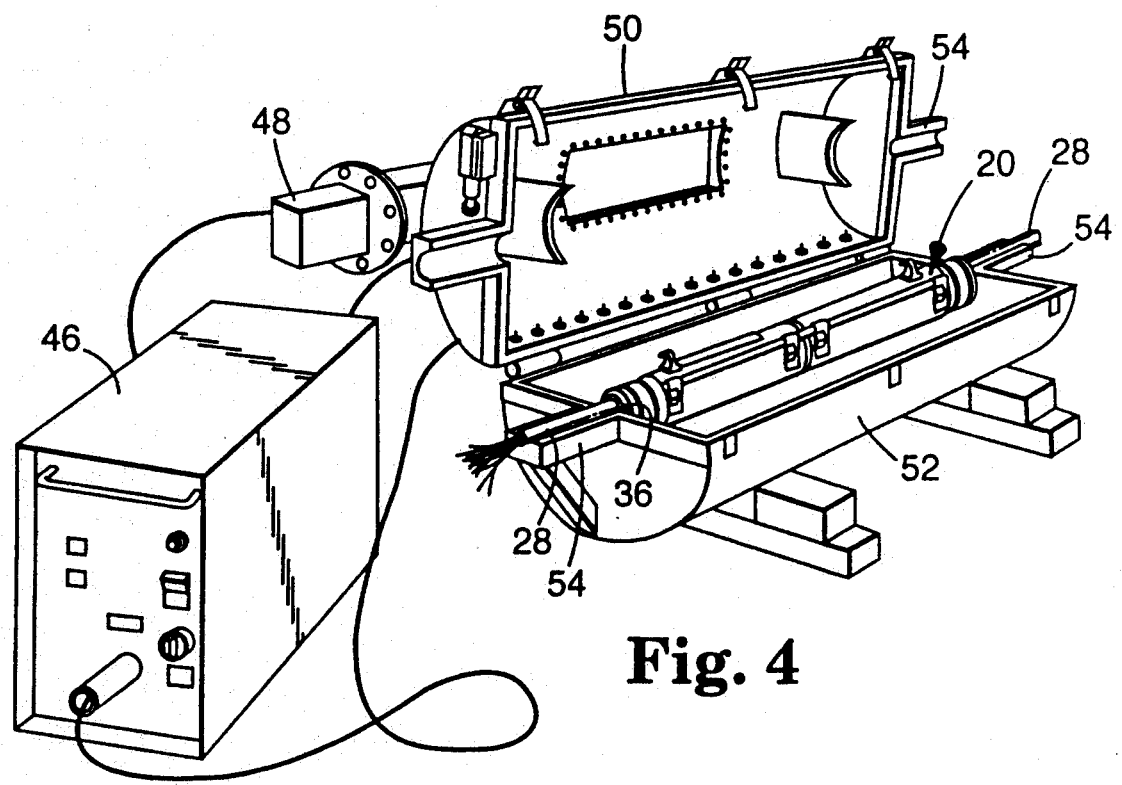
FIG. 4 is a perspective view depicting use of a clamshell-type microwave applicator to seal a splice closure according to the method of the present invention.

After the splice operation is completed and the closure is fastened shut, microwave energy may be applied to the assembly, causing susceptor particles 11 in the CBM to rapidly heat up. This is turn raises the temperature of the thermoplastic material of the closure adjacent to the CBM to its melting point, causing it to meld with the CBM. After microwave application stops, the CBM cools and forms a fused bond between the adjacent surfaces of the closure. While several prior art microwave applicators may be used to heat the CBM, the preferred applicator is embodied in the clamshell design shown, in FIG. 4. This design includes a power source 47 connected to a microwave source or generator 48 which is attached to the upper half 50 of the applicator. Upper half 50 is hingedly attached to lower half 52, and both halves include extensions 54 which support the cables and minimize lateral leakage of microwave radiation. This applicator preferably utilizes a power source similar to that sold by Gerling Laboratories of Modesto, Calif., under model number GL137R. The splice inside the closure should be wrapped with a metallic sheath such as a copper screen or aluminum tape in order to prevent the microwave field from inducing any voltage in the exposed wires. Otherwise, connectors may arc, and the wires may heat up considerably, with possible loss of data in communication lines.

In testing of the present method, it was found that the CBM sealing rings used to bond the end caps to the cables did not provide enough heat to cause the cable jackets to melt sufficiently to allow fusion bonding. This phenomenon occurred due to the presence of a conductive layer (e.g., an aluminum sheath) which lies inside the jacket, usually adjacent thereto, and is used to shield the telecommunications wires from ambient electromagnetic interference. Those skilled in the art will appreciate that the amplitude of the microwave radiation directed toward this area is reduced by the conductive shield and, indeed, the amplitude of the E-field at the surface of shield must be zero. It was therefore deemed desirable to include additional, or substitute, susceptor materials in the CBM material used to seal the closure to the cable jacket, such susceptor materials being more reactive to the H-field in the microwaves. Only certain materials, however, have the necessary high frequency response for magnetically reactive heating (e.g., hysteresis heating); for example, magnetic stainless steel coated particles have been found inadequate for this purpose. Satisfactory susceptor materials include ferrite and nickel powders.

Certain amorphous magnetic particles have also been found acceptable, particularly the particles recently developed by 3M's Life Sciences Sector Research Laboratory. These particles are described by the formula $F_{100-x-y}Tm_xMe_y$ where F (a ferromagnetic element) is one or more elements selected from the group including iron, cobalt and nickel, Tm (a transition metal) is one or more elements selected from the group including titanium, vanadium, chromium, manganese, zirconium, niobium and tantalum, Me (a metalloid element) is one or more elements selected from the group including boron, carbon, aluminum, silicon, phosphorous and germanium, and $0 \leq x \leq 20$ and $10 \leq y \leq 30$. These materials may be prepared by rapidly quenching technology, e.g., melt-spinning, and preferably contain more than 60% of the amorphous phase. The preferred size of these amorphous magnetic particles is in the range of 0.1 microns to 300 microns. These particles are disclosed more fully in U.S. patent application Ser. No.

07/800,632 (filed concurrently with this application), which is incorporated by reference.

Figure 5:
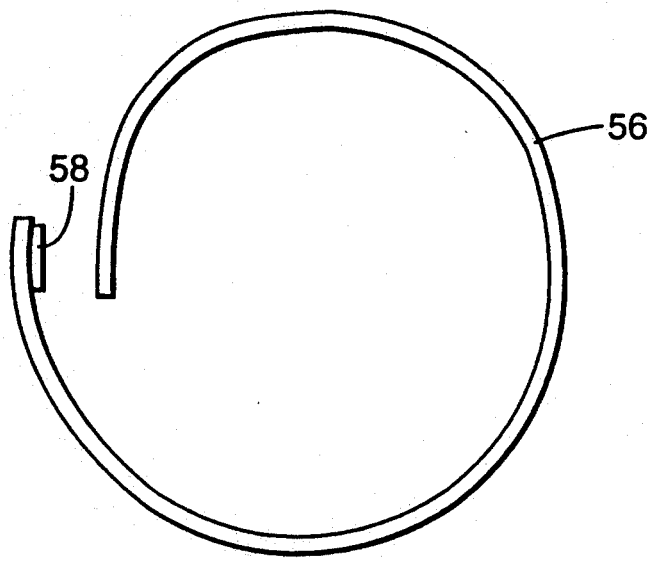
FIG. 5 is a cross-sectional view of a spirally sealed closure.
Figure 6:
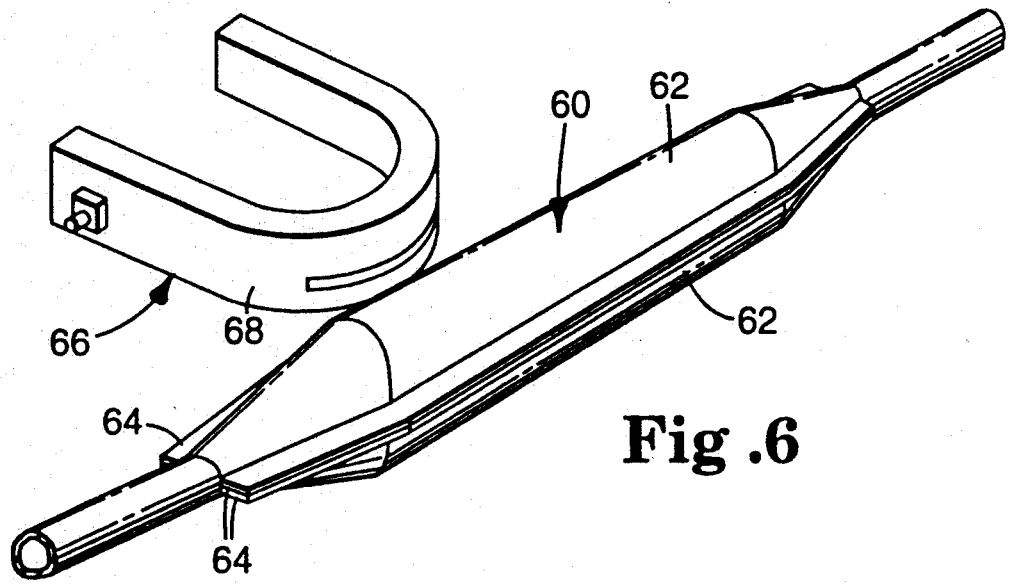
FIG. 6 is a perspective view illustrating an alternative splice closure design and microwave applicator.

The CBM and method of the present invention may easily be applied to other closure designs. For example, the spirally wrapped closure design 56 shown in cross-section in FIG. 5 has a wall which is formed from a single band of thermoplastic material. Closure 56 may be sealed by providing a strip 58 between the overlapping portions of the closure. Alternative designs for both a splice closure and microwave applicator are shown in FIG. 6. Splice closure 60 is constructed of two essentially identical halves 62 each having generally semicircular cross-sections with tapering ends, and longitudinal flanges or wings 64. A strip of CBM is provided between flanges 64, on each side of closure 60, which extend radially from the central axis of closure 60. Microwave applicator includes a similar power source as above, but has a waveguide 66 which is generally U-shaped, having a slot 68 along the bottom arcuate portion wide enough to receive flanges 64. In this manner, flanges 64 may be inserted into slot 68. This construction has the advantage of not applying microwave radiation to the entire splice area, which might incidentally heat up various components and wiring in the splice. End caps are also used with the construction of closure 60.

The foregoing methods may also be used to attach various accessories to a splice closure, such as aerial terminal boxes. This provides physical attachment without the use of standard clamps, etc., and further imparts weatherproofing to the entire assembly. A strip of CBM may also be used to repair an existing splice closure or a rupture in a cable jacket.

This technique presents many advantages over prior art bonding methods and materials. First of all, it is much simpler and less time-consuming than closures which require the clamps, gaskets, gels, resins, etc., previously referred to and, if the process results in an incomplete bond, the technician may simply reenergize the microwave applicator to reheat the joint and provide a more complete seal. The resulting seal clearly imparts a much stronger bond than adhesives since the CBM has physically fused with the material in the closure and the cable jacket. There is also less power consumption than with other fusion bonding techniques since the heating is concentrated directly at the interface between the coupling and the pipes, which further prevents distortion of the bulk of the closure or cable due to overheating. The technique of the present invention is also preferred over the use of heat shrink material since the hermetic seal formed by the CBM is impervious to moisture migration, and there is no need for open flame as required with heat shrink tubing. The microwave applicator may also be automated to remove much of the craft skill-dependent variability from the process.

The particular dimensions of the sheet or strip formed by the CBM may vary considerably according to the intended use. For example, it is clear that the length and width of the strip must be approximately equal to the length and width of the sealing edges of the closure, and the circumference of the sleeves which surround the end caps and cables must be slightly larger, respectively, than that of the end caps and cable. The thickness of the CBM material may vary within the range of about 0.1 to 10 mm, again depending upon the particular application and the required degree of heating and bonding.

For the specific use contemplated herein (i.e., sealing of polyethylene splice closures), the preferred composition of the CBM is a medium density polyethylene matrix loaded with 10% by volume susceptor particles formed by coating milled glass fibers with tungsten and aluminum oxide. Alternatively, the substrate for the susceptors may be polyethylene beads, which further reduces the amount of "contamination" (i.e., non-polyolefinic material) in the joint. For sealing of the closure to the cable jacket, the CBM is preferably formed of a matrix of medium density polyethylene loaded with 10% by volume ferrite powder or amorphous magnetic particles. The matrix should be miscible with the material of the closure. In this regard, the term "miscible" means capable of being dissolved or mixed at the interfacial surfaces, without necessarily penetrating the entire depth of the closure wall or cable jacket.

Other alternative compositions for the CBM will become apparent to those skilled in the art upon reference to the following examples. In these examples, the glass fibers used were 739-DD 1/16" available from Owens-Corning Fiberglass Corp. of Toledo, Ohio. The mica flakes used were SUZORITE ™ 200 HK available from Marietta Resources International, Ltd. of Hunt Valley, Md. Solid susceptor particles were also used and obtained from the noted sources. The CBM was produced by either mixing susceptor particles 11 with the desired matrix material 14 and hot pressing the so compounded material into a thin sheet or strip, or by direct extrusion of the mixture into a thin sheet as described in Example 2 below. The thickness of these CBM inserts was 1.0 mm.

The CBM of the invention, after application to the components to be welded, was heated by microwave energy produced in one of two microwave ovens: 1) Ammana RC/20SE, or 2) Raytheon RADARLINE ™ Model No. QMP 2101A-6. The Ammana was operated at 2 KW. The Raytheon was operated at either 3 or 6 KW as noted in specific examples.

Assemblies referred to in specific examples consist of one of the following:
(1) Sections cut perpendicular to the longitudinal centerline of 3M brand SLiC sheath retention aerial closures to yield a cylindrical object hinged along a longitudinal line at one surface and opening as a clamshell at the diametrically opposed surface. Two sizes were used—2-19SR and 3-33SR. The sections were either about 6" to 10" long or ½ of the closure. CBM was applied to the parting lines of the closure halves.
(2) Strips 1"×4"×0.1" thick (corresponding to the closure wall thickness) cut from the surface of a SLiC closure. These were welded by placing a 1" square piece of CBM between the strips and overlapping them by 1".
(3) A SLiC closure or the end portion thereof as described in (1) above. A disc was fitted in the open end of the closure, machined from ½" thick HDPE sheet (Resinol Type F) and containing a hole through which a length of polyethylene jacketed, aluminum sheathed multiconductor telecommunications cable was inserted.

Various types of CBM, as described in specific examples, were used between mating surfaces of the closure halves, between the end of the closure and the HDPE disc, and between the HDPE disc and the cable jacket. "LDPE" means low density polyethylene (D=0.910 to 0.925 g/cm$^3$), "MDPE" means medium density polyethylene (D=0.926 to 0.940 g/cm$^3$), and "HDPE"

means high density polyethylene (D=0.941 to 0.959 g/cm$^3$).

EXAMPLE 1

LDPE with Ferrite Powder

A hole in a disc of HDPE, Resinol Type F, was lined with CBM comprising a linear LDPE, sold by Union Carbide as HS-7064, compounded with 10% by volume ferrite powder No. 72802, available from D. M. Steward Manufacturing Co. of Chattanooga, Tenn., by dry mixing the parts and hot pressing into a thin sheet about 0.015" thick. A 0.75" multiconductor telecommunications cable was inserted into the lined hole. The assembly was placed into the RC 20SE microwave oven at 2 KW for about 1½ minutes. The two parts were securely bonded together. Visual inspection showed melt flow of the CBM and cable jacket.

EXAMPLE 2

LDPE with Amorphous Magnetic Particles and HDPE with Coated Mica Flakes

The linear LDPE of Example 1 was dry mixed with 10% by volume amorphous magnetic particles as described above, and hot pressed into a thin sheet about 0.011" thick. Two layers of this material were used to line a hole in a HDPE disc and a multiconductor telecommunications cable was inserted into the hole. Mica flakes were sputter coated with 1 nanometer of tungsten and overcoated with 1.6 nanometers of aluminum suboxide. A HDPE, Dow 8054, was compounded with 9.6% by volume of the coated mica using a 2" Baker Perkins co-rotating twin screw extruder. The polymer was introduced into the extruder using a K-Tron T-35 feeder. A 20 cc Zenith flow-through polymer gear pump was used to develop the pressure necessary to force the mixture through a standard 6" single-lip die with a die opening of about 0.020". The extruded material was then introduced into a nip formed by a rubber roller running against a steel roll, both chilled by tap water. Standard web handling equipment was used to wind the material onto take-up rolls. This material was used between mating halves of a 10" end section cut from a 3M brand SLiC closure, size 3-33SR. The material was also used between the periphery of the disc and the opening in the end of the closure. Prior to assembly, all mating surfaces were washed with soap and water and the surface of the cable was roughened with sandpaper. The assembly was placed in a 2 KW microwave oven for 1½ minutes. The assembly was successfully bonded together at all mating surfaces.

EXAMPLE 3

LDPE with Amorphous Magnetic Particles

Two layers of linear LDPE CBM containing 10% by volume amorphous magnetic particles were used to line the hole in a disc of HDPE, Resinol Type F. A 182" diameter multiconductor communications cable was placed through this hole with a snug slip fit. The assembly was placed a 2 KW microwave oven for 1 minute. Visual inspection showed that uniform melt bonding of the disc to the cable jacket was obtained.

EXAMPLE 4

HDPE with Coated Mica Flakes

Mica flakes were sputter coated with 1 nanometer of tungsten and overcoated with 1.6 nanometers of aluminum suboxide. A HDPE, Dow 8054, was compounded using the extrusion process of Example 2, with 9.6% by volume of the coated mica flakes. The extruded film was about 0.020" thick. Two layers were placed between mating surfaces of a section cut from a SLiC closure, size 3-33SR. The assembly was placed in microwave oven for 3 minutes. Visual inspection indicated melt bonding and flow of CBM material. It was not possible to separate the two parts of the closure with any reasonable force without destroying the parts.

EXAMPLE 5

LDPE with Coated Mica Flakes, HDPE with Coated Mica Flakes, and LDPE with Amorphous Magnetic Particles A SLiC closure, size 2-19SR, was assembled using two layers of the CBM as described in Example 4 between the mating surfaces of the closure halves. The HDPE end discs of Example 2 were used with the following CBM's. One layer of a 0.037" thick CBM was inserted between the discs and the closure, the CBM made by the press method described above and comprising the linear LDPE of Example 1, compounded with 15% by volume mica flakes sputter coated with 1 nanometer of tungsten and overcoated with 1.6 nanometers of aluminum suboxide. One layer of the CBM comprising LDPE with amorphous magnetic particles as described in Example 2 was placed between the cable jacket and the disc. The assembly was placed in a 6 KW microwave oven for 3 minutes. The assembly appeared to be bonded at all locations where the CBM was placed. Visual inspection showed melt flow of the CBM and closure material.

EXAMPLE 6

HDPE with Coated Mica Flakes

Mica flakes were sputter coated with 5.7 nanometers of stainless steel. A linear LDPE was compounded with 15% by volume of the coated mica flakes by the press method. The thickness of the CBM was about 0.037". Two pieces of cable jacket material were placed together with a 1 square inch overlap area and separated by a 1 square inch piece of the above mentioned CBM. The assembly was placed in a 2 KW oven for 30 seconds. The assembly was fusion bonded together.

EXAMPLE 7

HDPE with Coated Mica Flakes, MDPE with Coated Glass Fibers, and LDPE with Ferrite Powder A SLiC closure, size 2-19SR, was assembled with HDPE end discs and a section of telecommunications cable as described in Example 3, using the following CBM's. A CBM, comprising HDPE compounded with coated mica as described in Example 4, was applied between the mating surfaces of the closure halves. A CBM, comprising MDPE sold by Chevron as 9301T, compounded by the extrusion process with 5.4% by volume glass fibers sputter coated with 7.3 nanometers of tungsten and overcoated with 15 nanometers of aluminum suboxide, was placed between the end discs and the closure. A CBM of LDPE with ferrite powder as described in Example 1 was inserted between the discs and the cable jacket. The assembly was placed in a 6 KW microwave oven for 3 minutes. Visual inspection indicated that all interfacial surfaces were fusion bonded together. The assembly was pressure tested to 20 psi and was leak free.

EXAMPLE 8

MDPE with Coated Glass Fibers

MDPE was compounded by the extrusion process with 12.2% by volume of glass fibers sputter coated with 7.3 nanometers of tungsten and overcoated with 15 nanometers of aluminum suboxide. The resulting material was about 0.032" thick. Two strips, each 1"×4", were cut from a SLiC closure, overlapped by 1" and separated by a 1" square of the CBM described above. The assembly was placed in a 2 KW microwave oven for 3¼ minutes. The pieces were fusion bonded together. They could not be separated without destroying them.

EXAMPLE 9

Hot Melt Adhesive with Coated Glass Fibers

3M Brand Jet Melt ™ adhesive no. 3748 was compounded by the press method with 10% by volume glass fibers sputter coated with 1.6 nanometers of tungsten and overcoated with 15 nanometers of aluminum suboxide. A section of a SLiC closure, size 2-19SR, was assembled with 0.037" thick films of the above described hot melt CBM between the mating surfaces of the closure halves. The assembly was placed in a 2 KW microwave oven for 45 seconds. Visual inspection indicated melt flow of the CBM and closure material. It was not possible to separate the closure halves without destroying the parts.

EXAMPLE 10

MDPE with Coated Glass Fiber and MDPE with Ferrite Powder

A SLiC closure, size 2-19SR, was assembled with HDPE end discs and a section of telecommunications cable using the following CBM's. A CBM, comprising MDPE Chevron 9301T compounded by the extrusion process with 19.5% by volume glass fibers sputter coated with 7.3 nanometers of tungsten and overcoated with 15 nanometers of aluminum suboxide, was placed between the mating surfaces of the closure and between the end discs and the closure. A CBM, comprising MDPE, Chevron 9301T, compounded by the press method with 15% by volume ferrite powder, D. M. Steward No. 72802, was placed between the cable and the end discs. Both CBM films were approximately 0.040 inches thick. The assembly was placed in a 6 KW microwave oven for a total of 8 minutes. Visual inspection indicated good fusion bonding at the interfaces of all parts. The assembly was pressure tested to 20 psi and found to be leak free.

EXAMPLE 11

Hot Melt Adhesive with Coated Glass Fibers and Hot melt Adhesive with Ferrite Powder A SLiC closure, size 2-19SR, was assembled with HDPE end discs and a section of telecommunications cable using the following CBM's. A CBM, comprising 3M Brand Jet melt adhesive No. 3748 compounded by the press method with 10% by volume glass fibers sputter coated with 2.6 nanometers of tungsten and overcoated with 15 nanometers of aluminum suboxide, was placed between the mating surfaces of the closure and between the end discs and the closure. A CBM, comprising 3M Brand Jet melt adhesive No. 3748 compounded by the press method with 10% by volume ferrite powder, was place between the cable and the end discs. Both CBM films were approximately 0.040" thick. The assembly was placed in a 6 KW microwave oven first for one minute, examined quickly, and then for an additional minute, for a total of 2 minutes. Visual inspection showed melt flow of both the adhesive and the closure material. The assembly was pressure tested to 20 psi and found to be leak free.

EXAMPLE 12

HDPE with Coated Glass Fibers and HDPE with Ferrite Powder

A SLiC closure, size 2-19SR, was assembled with HDPE end discs and a section of telecommunications cable using the following CBM's. A CBM, comprising HDPE Chevron 9006T compounded by the extrusion process with 14.1% by volume glass fibers sputter coated with 3.4 nanometers of tungsten and overcoated with 5.5 nanometers of aluminum suboxide, was placed between the mating surfaces of the closure and between the end discs and the closure. This CBM was about 0.030" thick. A CBM, comprising HDPE Chevron 9006T compounded by the press method with 10% by volume ferrite powder, was placed between the cable and the end discs. This film was about 0.040" thick. The assembly was placed in a 6 KW microwave oven for 3 minutes. Visual inspection indicated that all joints were melted and fused. A pressure test at 20 psi revealed some minor leaks around the cable. The assembly was placed in the 6 KW microwave for an additional 3 minutes and pressure tested again at 20 psi. The assembly was leak free.

EXAMPLE 13

HDPE with Coated Glass Fibers and MDPE with Ferrite Powder

A SLiC closure, size 2-19SR, was assembled with HDPE end discs and a section of telecommunications cable using the following CBM's. A CBM, comprising HDPE Chevron 9006T compounded by the extrusion process with 20.4% by volume glass fibers sputter coated with 2.6 nanometers of tungsten and overcoated with 15 nanometers of aluminum suboxide, was placed between the mating surfaces of the closure and between the end discs and the closure. A CBM, comprising MDPE Chevron 9013T compounded by the press method with 15% by volume ferrite powder, was placed between the cable and the end discs. Film thicknesses were the same as in Example 12. The assembly was placed in a 6 KW microwave oven for 2 minutes. Visual inspection showed melt flow of the CBM and closure material. The housing was slightly deformed due to the heat generated by the CBM.

EXAMPLE 14

HDPE with Coated Mica Flakes and HDPE with Ferrite Powder

A SLiC closure, size 2-19SR, was assembled with HDPE end discs and a section of telecommunications cable using the following CBM's. A CBM, comprising HDPE Dow 8054 compounded by the extrusion process with 7.4% by volume mica, as described in Example 2, and sputter coated with 5.7 nanometers of stainless steel, was placed between the mating surfaces of the closure and between the end discs and the closure. A CBM, comprising HDPE Chevron 9006T compounded by the press method with 10% by volume ferrite powder, was placed between the cable and the end discs.

The assembly was placed in a 6 KW microwave oven for 4.0 minutes, inspected and placed in the oven for an additional 4.0 minutes. Visual inspection showed good melt bonding around the cable and some melt bonding at the other interfaces.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim

1. A microwave heating tubular closure for receiving one end of a cable having a plurality of wires and for protecting a splice of wires, the closure having a top member and a bottom member, both of said members begin formed of a thermoplastic material and each having an essentially semicircular cross-section, said members being longitudinally attached by a hinge defining two sealing edge generally diametrically opposite said hinge, a first edge of said sealing edges begin on said top member and a second edge of said sealing edges being on said bottom member, wherein the improvement comprises:
a strip of composite bonding material formed of a plurality of susceptor particles dispersed in a matrix, each of said susceptor particles being constructed of a substrate which is essentially non-reflective of microwave energy, and a coating surrounding said substrate, said coating being substantially absorptive of microwave energy, said coating having a thickness in the range of 1–100 Angstroms and having an electrical conductivity in the range of $10^{-6}$ to $10^7$ $\Omega$-cm, resulting in said susceptor particles having a bulk resistivity in the range of $10^{-2}$ to $10^8$ $\Omega$-cm, and said matrix comprising a thermoplastic material which is miscible with said thermoplastic material of said members, said strip being placed between said sealing edges.

2. The closure of claim 1 wherein said hinge is integrally molded with said top and bottom members, and further comprising another strip of said composite bonding material placed along an inner surface of said hinge.

3. The closure of claim 1 wherein the closure additionally includes an end cap having a hole therein for receiving the cable, the cable having an outer jacket of thermoplastic material and an inner conductive layer adjacent the outer jacket, and further comprising a sleeve of magnetically reactive composite bonding material placed along an inner surface of said hole, said magnetically reactive composite bonding material being formed of a plurality of ferromagnetic susceptor particles dispersed in a matrix, said matrix comprising a thermoplastic material which is miscible with the thermoplastic material of the outer jacket of the cable.

4. The closure of claim 1 wherein said matrix is formed of polyethylene.

5. The closure of claim 3 wherein said end cap is attached to an inner surface of said bottom member, and a portion of a periphery of said end cap is adjacent to an inner surface of said top member when the closure is in a closed position, and further comprising another strip of said composite bonding material placed on said portion of said periphery of said end cap.

6. A microwave heating tubular closure for receiving one end of a cable having a plurality of wires and for protecting a splice of wires, the closure having essentially identical top and bottom members formed of a thermoplastic material, each member having at least one longitudinal flange extending outwardly from the closure, and said top member positionable against said bottom member whereby flanges form an adjacent strip, wherein the improvement comprises:
a strip of composite bonding material formed of a plurality of susceptor particles dispersing a matrix, each of said susceptor particles being constructed of a substrate which is essentially non-reflective of microwave energy, said substrate having a coating thereon which is substantially absorptive of microwave energy, said coating having a thickness in the range of 1–100 Angstroms and having an electrical conductivity in the range of $10^{-6}$ to $10^7$ $\Omega$-cm, resulting in said susceptor particles having a bulk resistivity in the range of $10^{-2}$ to $10^8$ $\Omega$-cm, and said matrix comprising a thermoplastic material which is miscible with said thermoplastic material of said members, said strip being placed between said pair of adjacent flanges.

7. The closure of claim 6 wherein each of said members has two flanges, defining a second pair of adjacent flanges in said closure, and further comprising another strip of said composite bonding material placed between said second pair of adjacent flanges.

8. The closure of claim 6 wherein the closure additionally includes an end cap having a hole therein for receiving the cable, the cable having an outer jacket of thermoplastic material and an inner conductive layer adjacent the outer jacket, and further comprising a sleeve of magnetically reactive composite bonding material placed along an inner surface of said hole, said magnetically reactive composite bonding material being formed of a plurality of ferromagnetic susceptor particles dispersed in a matrix, said matrix comprising a thermoplastic material which is miscible with the thermoplastic material of the outer jacket of the cable.

9. The closure of claim 5 wherein said matrix is formed of polyethylene.

10. The closure of claim 8 wherein said end cap is attached to an inner surface of said bottom member, and a portion of a periphery of said end cap is adjacent to an inner surface of said top member when the closure is in an assembled state, and further comprising another strip of said composite bonding material placed on said portion of said periphery of said end cap.

* * * * *

UNITED STATES PATENT AND TRADEMARK OFFICE
CERTIFICATE OF CORRECTION

PATENT NO. : 5,245,151
DATED : September 14, 1993
INVENTOR(S) : Craig S. Chamberlain, et. al.

It is certified that error appears in the above-indentified patent and that said Letters Patent is hereby corrected as shown below:

Column 7, Line 14, "RC 20SE" should read --RC/20SE--.

Column 7, Line 57, "182"" should read --3/4"--.

Column 8, Line 5, "microwave oven" should read --2 KW microwave oven--.

Column 12, Line 17, "said" should be inserted before --flanges--.

Column 12, Line 17, "strip" should read --pair--.

Signed and Sealed this

Eleventh Day of October, 1994

Attest:

BRUCE LEHMAN

Attesting Officer

Commissioner of Patents and Trademarks